(12) United States Patent
Chang

(10) Patent No.: US 8,595,420 B2
(45) Date of Patent: *Nov. 26, 2013

(54) METHOD FOR DISPATCHING AND TRANSMITTING DATA STREAMS BETWEEN HOST SYSTEM AND MEMORY STORAGE APPARATUS HAVING NON-VOLATILE MEMORY AND SMART CARD CHIP, MEMORY CONTROLLER, AND MEMORY STORAGE APPARATUS

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 230 days.

This patent is subject to a terminal disclaimer.

(21) Appl. No.: 13/224,348

(22) Filed: Sep. 2, 2011

(65) Prior Publication Data

US 2013/0013851 A1  Jan. 10, 2013

(30) Foreign Application Priority Data

Jul. 4, 2011  (TW) .............................. 100123508 A

(51) Int. Cl.
*G06F 12/00* (2006.01)

(52) U.S. Cl.
USPC .................. 711/103; 711/122; 711/5; 711/2; 711/154; 711/170; 711/E12.008

(58) Field of Classification Search
USPC .......... 711/103, 102, 5, 2, 154, 170, E12.008; 710/52
See application file for complete search history.

(56) References Cited

U.S. PATENT DOCUMENTS

| 4,071,706 A * | 1/1978 | Warren ......................... 370/463 |
| 7,963,443 B2 * | 6/2011 | Patton ............................ 235/451 |
| 2009/0125643 A1 * | 5/2009 | Prevost et al. .................. 710/10 |
| 2011/0022746 A1 * | 1/2011 | Chang ............................ 710/52 |

* cited by examiner

*Primary Examiner* — Mardochee Chery
(74) *Attorney, Agent, or Firm* — Jianq Chyun IP Office

(57) ABSTRACT

A data stream dispatching method for a memory storage apparatus having a non-volatile memory module and a smart card chip is provided. The method includes configuring a plurality of logical block addresses for the non-volatile memory module, wherein a plurality of specific logical block addresses is used for storing a specific file. The method also includes receiving a response data unit from the smart card chip and storing the response data unit into a buffer memory. The method further includes when a logical block address corresponding to a read command issued by a host system is one of the specific logical block addresses and the response data unit is stored in the buffer memory, transmitting the response data unit to the host system by aligning an access unit. Thereby, the host system can correctly receive the response data unit from the smart card chip.

26 Claims, 9 Drawing Sheets

METHOD FOR DISPATCHING AND TRANSMITTING DATA STREAMS BETWEEN HOST SYSTEM AND MEMORY STORAGE APPARATUS HAVING NON-VOLATILE MEMORY AND SMART CARD CHIP, MEMORY CONTROLLER, AND MEMORY STORAGE APPARATUS

CROSS-REFERENCE TO RELATED APPLICATION

This application claims the priority benefit of Taiwan application serial no. 100123508, filed on Jul. 4, 2011. The entirety of the above-mentioned patent application is hereby incorporated by reference herein and made a part of this specification.

BACKGROUND

1. Technology Field

The present invention generally relates to a data stream dispatching method, and more particularly, to a method for dispatching and transmitting a data stream between a host system and a memory storage apparatus having a non-volatile memory and a smart card chip, and a memory controller and a memory storage apparatus using the same.

2. Description of Related Art

Along with the widespread of digital cameras, cell phones, and MP3 in recently years, the consumers' demand to storage media has increased drastically. Non-volatile memory (for example, flash memory) is one of the most adaptable storage media to aforementioned portable multimedia devices due to its many characteristics such as data non-volatility, low power consumption, small volume, and non-mechanical structure.

On the other hand, smart cards have been widely used along with the acceptance of e-wallet and prepayment. A smart card is an IC chip which comes with a microprocessor, a card operating system, a security module, and a memory, and which allows a card holder to execute predetermined operations. A smart card offers calculation, encryption, bi-directional communication, and security functions such that besides storing data, the smart card can protect the data stored therein. The subscriber identification module (SIM) card in a cellular phone adopting the Global System for Mobile Communications (GSM) mechanism is an example of smart card application. However, a smart card offers a very limited storage capacity. Accordingly, in recent years, a smart card is usually integrated with a large-capacity memory card to increase the storage capacity of the smart card.

However, in a memory card disposed with both a rewritable non-volatile memory module and a smart card chip, how to identify a data stream from a host system as a command data unit of the smart card chip and transmit a response data unit from the smart card chip to the host system has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data stream dispatching method, a memory controller, and a memory storage apparatus, where a data unit belonging to a smart card chip can be correctly and effectively transmitted.

According to an exemplary embodiment of the present invention, a data stream dispatching method for a memory storage apparatus having a rewritable non-volatile memory module and a smart card chip is provided. The data stream dispatching method includes configuring a plurality of logical block addresses for the rewritable non-volatile memory module, wherein a plurality of specific logical block addresses among the logical block addresses is used for storing a specific file. The data stream dispatching method includes receiving a read command from a host system and determining whether a start read address corresponding to the read command is one of the specific logical block addresses. The data stream dispatching method still includes determining whether the response data unit is stored in the buffer memory when the start read address corresponding to the read command is one of the specific logical block addresses. The data stream dispatching method further still includes transmitting the response data unit from the buffer memory to the host system by aligning an access unit when the response data unit is stored in the buffer memory.

According to an exemplary embodiment of the present invention, a data stream dispatching method for a memory storage apparatus having a rewritable non-volatile memory module and a smart card chip is provided. The data stream dispatching method includes configuring a plurality of logical block addresses for the rewritable non-volatile memory module, wherein a plurality of specific logical block addresses among the logical block addresses is used for storing a specific file. The data stream dispatching method also includes storing a response data unit into a buffer memory when the response data unit is received from the smart card chip. The data stream dispatching method further includes receiving a read command from a host system and determining whether a start read address corresponding to the read command is one of the specific logical block addresses. The data stream dispatching method still includes determining whether the response data unit is stored in the buffer memory when the start read address corresponding to the read command is one of the specific logical block addresses. The data stream dispatching method further still includes determining whether a read address corresponding to a polling command issued by the host system is a multiple of an access unit when the response data unit is not stored in the buffer memory, wherein when the read address corresponding to the polling command is not a multiple of the access unit, following step (a) is executed, and when the read address corresponding to the polling command is a multiple of the access unit, following step (b) is executed. In step (a), a second data stream is transmitted to the host system in response to the polling command, wherein each bit in the second data stream is 0. In step (b), whether the response data unit is stored in the buffer memory is determined, wherein when the response data unit is stored in the buffer memory, following step (c) is executed, and when the response data unit is not stored in the buffer memory, following step (d) is executed. In step (c), the response data unit is transmitted from the buffer memory to the host system. In step (d), the second data stream is transmitted to the host system in response to the polling command.

According to an exemplary embodiment of the present invention, a memory controller for a memory storage apparatus having a rewritable non-volatile memory module and a smart card chip is provided. The memory controller includes a host interface, a memory interface, a buffer memory, and a memory management circuit. The host interface is configured to couple to a host system. The memory interface is configured to couple to the rewritable non-volatile memory module. The memory management circuit is coupled to the buffer memory, the host interface, and the memory interface. The memory management circuit configures a plurality of logical block addresses for the rewritable non-volatile memory module, wherein a plurality of specific logical block addresses among the logical block addresses is used for storing a specific file. When a response data unit is received from the smart card chip, the memory management circuit stores the response data unit into the buffer memory. The memory management circuit also receives a read command from the host system and determines whether a start read address corresponding to the read command is one of the specific logical block addresses. When the start read address corresponding to the read command is one of the specific logical block addresses, the memory management circuit determines whether the response data unit is stored in the buffer memory. When the response data unit is stored in the buffer memory, the memory management circuit transmits the response data unit from the buffer memory to the host system by aligning an access unit.

According to an exemplary embodiment of the present invention, a memory controller for a memory storage apparatus having a rewritable non-volatile memory module and a smart card chip is provided. The memory controller includes a host interface, a memory interface, a buffer memory, and a memory management circuit. The host interface is configured to couple to a host system. The memory interface is configured to couple to the rewritable non-volatile memory module. The memory management circuit is coupled to the buffer memory, the host interface, and the memory interface. The memory management circuit configures a plurality of logical block addresses for the rewritable non-volatile memory module, wherein a plurality of specific logical block addresses among the logical block addresses is used for storing a specific file. When a response data unit is received from the smart card chip, the memory management circuit stores the response data unit into the buffer memory. The memory management circuit also receives a read command from the host system and determines whether a start read address corresponding to the read command is one of the specific logical block addresses. When the start read address corresponding to the read command is one of the specific logical block addresses, the memory management circuit determines whether the response data unit is stored in the buffer memory. When the response data unit is not stored in the buffer memory, the memory management circuit determines whether a read address corresponding to a polling command issued by the host system is a multiple of an access unit. When the read address corresponding to the polling command is not a multiple of the access unit, the memory management circuit transmits a second data stream to the host system in response to the polling command, wherein each bit in the second data stream is 0. When the read address corresponding to the polling command is a multiple of the access unit, the memory management circuit determines whether the response data unit is stored in the buffer memory. When the response data unit is stored in the buffer memory, the memory management circuit transmits the response data unit from the buffer memory to the host system, and when the response data unit is not stored in the buffer memory, the memory management circuit transmits the second data stream to the host system in response to the polling command.

According to an exemplary embodiment of the present invention, a memory storage apparatus including a connector, a rewritable non-volatile memory module, a smart card chip, and a memory controller is provided. The connector is configured to couple to a host system. The memory controller is coupled to the connector, the rewritable non-volatile memory module, and the smart card chip and has a buffer memory. The memory controller configures a plurality of logical block addresses for the rewritable non-volatile memory module, wherein a plurality of specific logical block addresses among the logical block addresses is used for storing a specific file. When a response data unit is received from the smart card chip, the memory controller stores the response data unit into the buffer memory. The memory controller also receives a read command from the host system and determines whether a start read address corresponding to the read command is one of the specific logical block addresses. When the start read address corresponding to the read command is one of the specific logical block addresses, the memory controller determines whether the response data unit is stored in the buffer memory. When the response data unit is stored in the buffer memory, the memory controller transmits the response data unit from the buffer memory to the host system by aligning an access unit.

According to an exemplary embodiment of the present invention, a memory controller disposed in a memory storage apparatus having a rewritable non-volatile memory module and a smart card chip is provided. The memory controller includes a host interface, a memory interface, a buffer memory, and a memory management circuit. The host interface is configured to couple to a host system. The memory interface is configured to couple to the rewritable non-volatile memory module. The memory management circuit is coupled to the buffer memory, the host interface, and the memory interface. The memory management circuit configures a plurality of logical block addresses for the rewritable non-volatile memory module, wherein a plurality of specific logical block addresses among the logical block addresses is used for storing a specific file. When a response data unit is received from the smart card chip, the memory management circuit stores the response data unit into the buffer memory. The memory management circuit also receives a read command from the host system and determines whether a start read address corresponding to the read command is one of the specific logical block addresses. When the start read address corresponding to the read command is one of the specific logical block addresses, the memory management circuit determines whether the response data unit is stored in the buffer memory. When the response data unit is not stored in the buffer memory, the memory controller determines whether a read address corresponding to a polling command issued by the host system is a multiple of an access unit. When the read address corresponding to the polling command is not a multiple of the access unit, the memory controller transmits a second data stream to the host system in response to the polling command, wherein each bit in the second data stream is 0. When the read address corresponding to the polling command is a multiple of the access unit, the memory controller determines whether the response data unit is stored in the buffer memory. When the response data unit is stored in the buffer memory, the memory controller transmits the response data unit from the buffer memory to the host system, and when the response data unit is not stored in the buffer memory, the memory controller transmits the second data stream to the host system in response to the polling command.

As described above, in the data stream dispatching methods, the memory controllers, and the memory storage apparatuses provided by exemplary embodiments of the present invention, a command data unit and a response data unit of a smart card chip can be correctly transmitted. In addition, in the data stream dispatching methods, the memory controllers, and the memory storage apparatuses provided by other exemplary embodiments of the present invention, the time for transmitting a response data unit can be effectively shortened.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
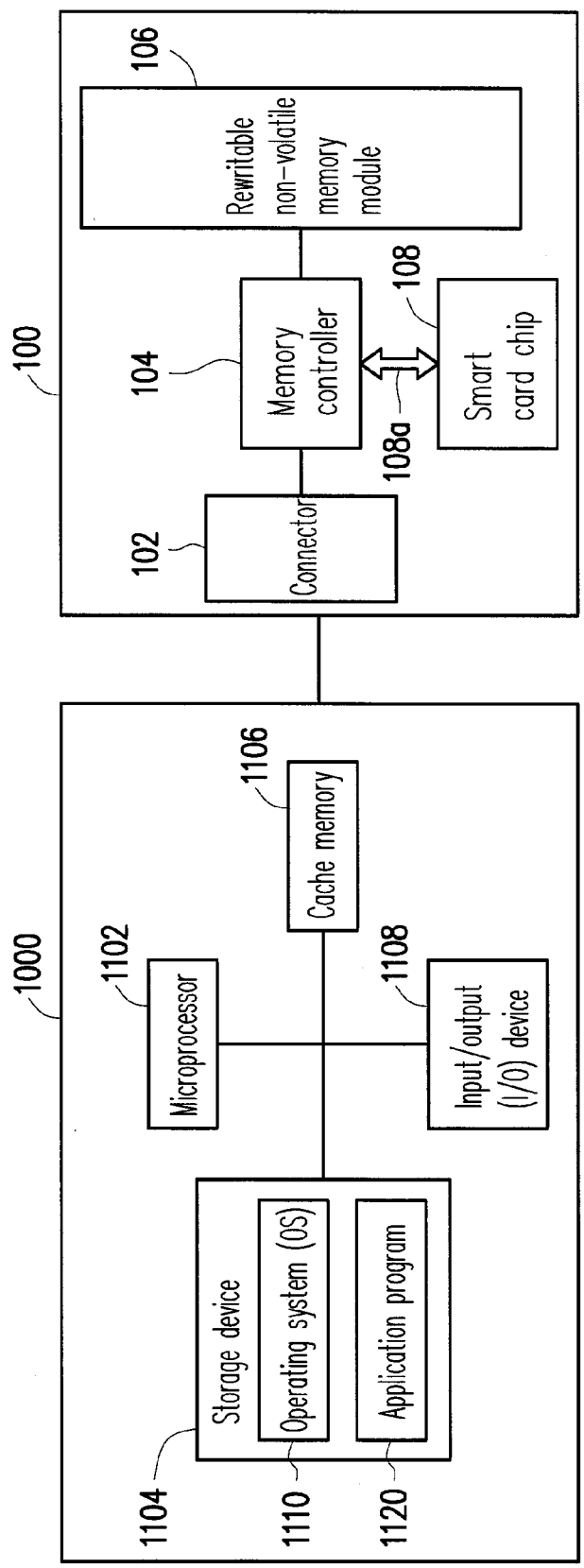
FIG. 1 is a schematic block diagram of a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1 is a schematic block diagram of a host system and a memory storage apparatus according to the first exemplary embodiment of the invention.

Referring to FIG. 1, the host system 1000 includes a microprocessor 1102, a storage device 1104, a cache memory 1106, and an input/output (I/O) device 1108. When the host system 1000 is turned on, the microprocessor 1102 executes an operating system (OS) 1110 installed in the storage device 1104 so that the host system 1000 can provide corresponding functions according to the operations of a user. For example, if the host system 1000 is a cell phone system and the OS 1110 is Symbian, Android, or another OS, after the host system 1000 is turned on, a user can operate the host system 1000 through the I/O device 1108 to execute communication and audio/video playing functions. Even though the host system 1000 is described as a cell phone system in the present exemplary embodiment, in another exemplary embodiment of the invention, the host system 1000 may also be a computer, a digital camera, a video camera, an audio player, or a video player.

The memory storage apparatus 100 is coupled to the host system 1000 so that data can be written into or read from the memory storage apparatus 100 according to commands issued by the OS 1110 of the host system 1000. For example, when the host system 1000 is a cell phone system, the memory storage apparatus 100 is a secure digital (SD) card, a multi media card (MMC) card, a memory stick (MS), a compact flash (CF) card, or an embedded storage device. Herein the embedded storage device includes embedded MMC (eMMC). It should be mentioned that an eMMC is directly coupled to a motherboard of a host system.

The memory storage apparatus 100 includes a connector 102, a memory controller 104, and a rewritable non-volatile memory module 106.

The connector 102 complies with the SD standard. However, the invention is not limited thereto, and the connector 102 may also comply with the MS standard, the MMC standard, the CF standard, the Institute of Electrical and Electronic Engineers (IEEE) 1394 standard, the peripheral component interconnect (PCI) express standard, the serial advanced technology attachment (SATA) standard, the universal serial bus (USB) standard, the integrated device electronics (IDE) standard, or any other standard.

The memory controller 104 executes a plurality of logic gates or control instructions implemented in a hardware form or a firmware form and performs various data operations on the rewritable non-volatile memory module 106 according to commands issued by the host system 1000. In particular, the memory controller 104 may execute a data stream dispatching method in the present exemplary embodiment to dispatch and transmit data streams.

The rewritable non-volatile memory module 106 is coupled to the memory controller 104 and configured to store data written by the host system 1000. The rewritable non-volatile memory module 106 includes a plurality of physical blocks. Each of the physical blocks has a plurality of physical pages, wherein the physical pages belonging to the same physical block may be individually written but have to be erased all together. To be specific, physical block is the smallest erasing unit. Namely, each physical block contains the least number of memory cells that are erased all together. Physical page is the smallest programming unit. Namely, physical page is the smallest unit for writing data. However, in another exemplary embodiment, the smallest unit for writing data may also be sector or another unit.

In the present exemplary embodiment, the memory controller 104 logically groups the physical blocks of the rewritable non-volatile memory module 106 into a data area, a spare area, a system area, and a replacement area. Physical blocks in the data area and the spare area are alternatively used for storing data written by the host system 1000. Physical blocks in the system area are used for storing system data of the memory storage apparatus 100. Physical blocks in the replacement area are used for replacing damaged physical blocks in the data area and the spare area. In addition, in order to allow the host system 1000 to conveniently access the physical blocks that are alternatively used for storing data, the memory controller 104 configures logical block addresses LBA(0)-LBA(N) to be mapped to the physical blocks, so that the host system 1000 can directly access data according to the logical block addresses. For example, in the present exemplary embodiment, a logical block address LBA(0) has a capacity of 4 kilobytes (KB). However, the present invention is not limited thereto.

In the present exemplary embodiment, the rewritable non-volatile memory module 106 is a re-writable non-volatile memory module, for example, a multi level cell (MLC) NAND flash memory module. However, the invention is not limited thereto, and the rewritable non-volatile memory module 106 may also be a single level cell (SLC) NAND flash memory module, any other flash memory module, or any other memory module having the same characteristics.

In the present exemplary embodiment, the memory storage apparatus 100 further includes a smart card chip 108. The smart card chip 108 is coupled to the memory controller 104 via an interface 108a, wherein the interface 108a is an interface exclusively used for communicating with the smart card chip 108.

The smart card chip 108 has a microprocessor, a security module, a read only memory (ROM), a random access memory (RAM), an electrically erasable programmable read-only memory (EEPROM), and an oscillator, etc. The microprocessor controls the overall operation of the smart card chip 108. The security module encrypts/decrypts data stored in the smart card chip 108. The oscillator generates a clock signal required by the operation of the smart card chip 108. The RAM temporarily stores operation data or firmware programs. The EEPROM stores user data. The ROM stores firmware programs of the smart card chip 108. To be specific, when the smart card chip 108 is in operation, the microprocessor of the smart card chip 108 executes the firmware programs in the ROM to execute related operations.

In particular, the security module of the smart card chip 108 executes a security mechanism to prevent any attack to data stored in the smart card chip 108. Herein the attack may be timing attack, single-power-analysis attack, or differential-power-analysis attack. Besides, the security mechanism executed by the smart card chip 108 complies with the third or higher level of the Federal Information Processing Standards (FIPS) 140-2 or the third or higher level of EMV EL. Namely, the smart card chip 108 passes an authentication of the fourth or higher level of FIPS 140-2 or an authentication of the fourth or higher level of EMV EL. Herein FIPS are publicly announced standards developed by the United States federal government for use by all non-military government agencies and by government contractors, and FIPS 140-2 specifics different levels of data security. In addition, EMV is a global standard for financial transactions and authentications of smart cards, integrated circuit (IC) card capable point of sale (POS) terminals, and automated teller machines (ATMs). The EMV standards define the interaction at the physical, electrical, data and application levels between IC credit and debit cards payment systems. In the present exemplary embodiment, the memory storage apparatus 100 offers services with identify-based authentication (for example, a micro payment service and a ticket service) through the operation of the smart card chip 108.

Figure 2:
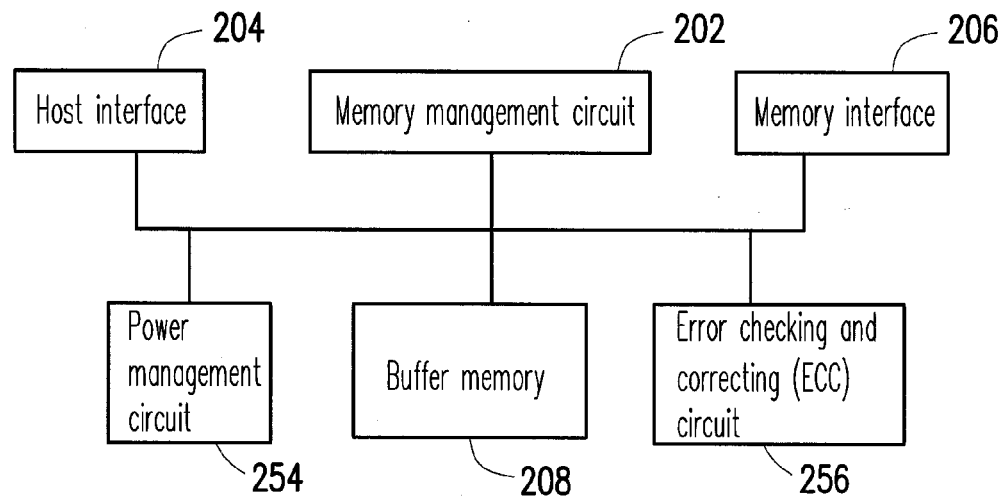
FIG. 2 is a schematic block diagram of a memory controller according to the first exemplary embodiment of the present invention.

FIG. 2 is a schematic block diagram of a memory controller according to the first exemplary embodiment of the invention.

Referring to FIG. 2, the memory controller 104 includes a memory management circuit 202, a host interface 204, a memory interface 206, and a buffer memory 208.

The memory management circuit 202 controls the overall operation of the memory controller 104. To be specific, memory management circuit 202 has a plurality of control instructions, and when the memory storage apparatus 100 is powered on, the control instructions are executed to control the overall operation of the memory controller 104.

In the present exemplary embodiment, the control instructions of the memory management circuit 202 are implemented in a firmware form. For example, the memory management circuit 202 has a microprocessor unit (not shown) and a ROM (not shown), and the control instructions are burnt into the ROM. When the memory storage apparatus 100 is in operation, the control instructions are executed by the microprocessor unit.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). Particularly, the ROM has a boot code, and when the memory controller 104 is enabled, the microprocessor unit first executes the boot code to load the control instructions from the rewritable non-volatile memory module 106 into the RAM of the memory management circuit 202. After that, the microprocessor unit runs these control instructions. Moreover, in yet another exemplary embodiment of the invention, the control instructions of the memory management circuit 202 may also be implemented in a hardware form.

The host interface 204 is coupled to the memory management circuit 202 and configured to receive and identify commands and data sent by the host system 1000.

Namely, commands and data sent by the host system 1000 are transmitted to the memory management circuit 202 via the host interface 204. In the present exemplary embodiment, the host interface 204 complies with the SD standard. However, the invention is not limited thereto, and the host interface 204 may also comply with the MS standard, the MMC standard, the CF standard, the PATA standard, the IEEE 1394 standard, the PCI express standard, the SATA standard, the USB standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The buffer memory 208 is coupled to the memory management circuit 202 and configured to temporarily store data and commands from the host system 1000 or data from the rewritable non-volatile memory module 106.

In the exemplary embodiment, the memory controller 104 further may include a power management circuit 254 and an error checking and correcting (ECC) circuit 256.

The power management circuit 254 is coupled to the memory management circuit 202 and configured to control the power supply of the memory storage apparatus 100.

The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatility memory module 106. Subsequently, when the memory management circuit 202 reads the data from the rewritable non-volatility memory module 106, it also reads the ECC code corresponding to the data, and the ECC circuit 256 executes the ECC procedure on the data according to the ECC code.

It should be mentioned that the smart card chip 108 does not directly communicate with the host system 1000 via a smart card interface (i.e., the interface 108a). Instead, it receives commands and data from the host system 1000 and transmits data to the host system 1000 via the connector 102 of the memory storage apparatus 100. Accordingly, in the first exemplary embodiment, an application program 1120 is installed in the host system 1000 for processing command data units to be transmitted to the smart card chip 108 and identifying response data units received from the smart card chip 108. For example, in the present exemplary embodiment, a command data unit transmitted to the smart card chip 108 is referred to as a command-application protocol data unit (C-APDU), and a response data unit received from the smart card chip 108 is referred to as a response-application protocol data unit (R-APDU). In particular, the memory controller 104 identifies and transmits C-APDUs and R-APDUs of the smart card chip 108 according to the data stream dispatching method in the present exemplary embodiment. Namely, when the host system 1000 performs operations on the memory storage apparatus 100 with the rewritable non-volatile memory module 106 and the smart card chip 108, the memory controller 104 works with the application program 1120 to transmit and dispatch C-APDUs to be issued to the smart card chip 108 according to the data stream dispatching method in the present exemplary embodiment, so as to correctly transmit data streams belonging to the C-APDUs to the smart card chip 108 and correctly transmit R-APDUs from the smart card chip 108 back to the host system 1000.

Figure 3:
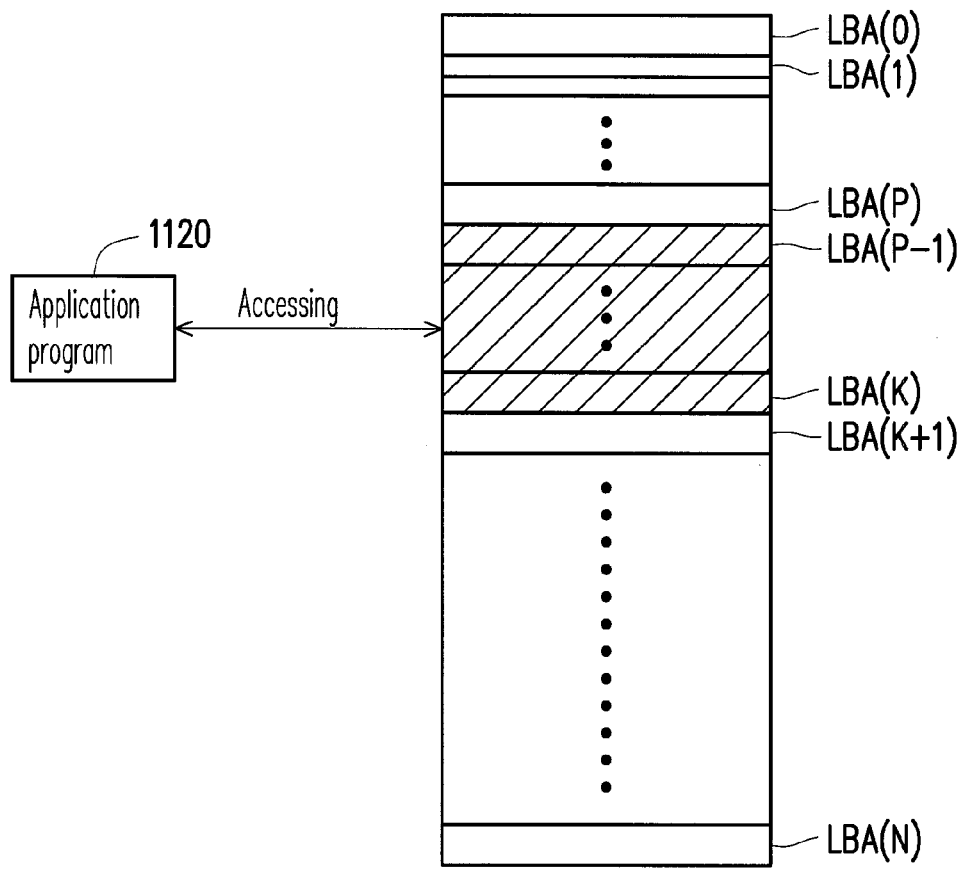
FIG. 3 is a diagram illustrating how an application program accesses a memory storage apparatus according to the first exemplary embodiment of the present invention.

In the present exemplary embodiment, the application program 1120 stores one or more files in the memory storage apparatus 100 and transmits information of the logical block addresses for storing the files to the memory controller 104. For example, when the application program 1120 issues a command to store a file RF into the memory storage apparatus 100, the OS 1110 uses some of the logical block addresses (for example, the logical block addresses LBA(P)-LBA(K)) to write the file RF according to the file system (not shown) of the memory storage apparatus 100. Herein the logical block addresses used for storing the file RF are referred to as specific logical block addresses (as indicated by the diagonal lines in FIG. 3).

Particularly, in the present exemplary embodiment, any operation regarding the smart card chip 108 is accomplished by accessing the file RF through the application program 1120. Namely, the application program 1120 transmits a C-APDU to the memory storage apparatus 100 through a write command for writing the file RF and reads an R-APDU from the memory storage apparatus 100 through a read command for reading the file RF. It should be mentioned that in other operating systems, the application program 1120 may also directly access the specific logical block addresses corresponding to the file RF to execute operations on the smart card chip 108.

To be specific, the memory management circuit 202 of the memory controller 104 includes a state machine and updates the state of the state machine according to the operations performed by the host system 1000 on the smart card chip 108. In addition, when the application program 1120 accesses the file RF, the memory controller 104 determines whether to transmit a data stream from the host system 1000 to the smart card chip 108 or transmit a corresponding response message back to the host system 1000 according to the state of the state machine.

Figure 4:
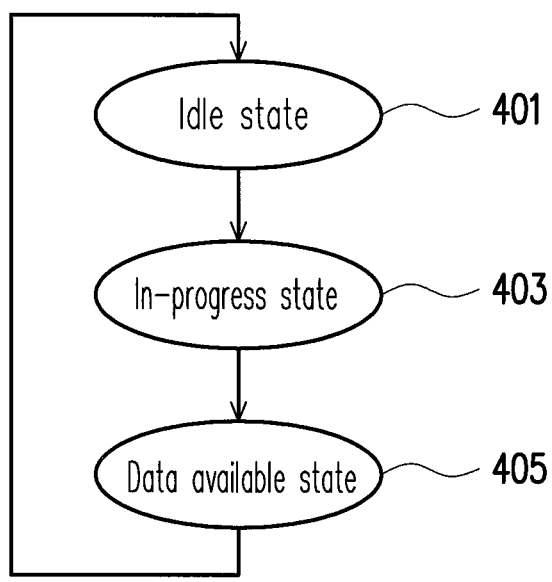
FIG. 4 is a diagram of a state machine according to the first exemplary embodiment of the present invention.

FIG. 4 is a diagram of a state machine according to the first exemplary embodiment of the invention.

Referring to FIG. 4, when the memory storage apparatus 100 is powered on, the state machine is in an idle state 401. When the state machine is in the idle state 401, the memory controller 104 determines whether a write command issued by the host system 1000 is corresponding to the specific logical block addresses and whether the data stream corresponding to the write command contains a specific mark. To be specific, when the application program 1120 transmits a C-APDU to the memory storage apparatus 100, the application program 1120 encapsulates the specific mark and the C-APDU into a data stream to be written into the file RF, and the OS 1110 issues a write command to the memory storage apparatus 100 for writing the data stream into the specific logical block addresses. The specific mark may be recorded in a header of the data stream. Accordingly, when the memory storage apparatus 100 receives a write command and a data stream corresponding to the write command from the host system 1000, the memory management circuit 202 identifies that the write command is corresponding to the specific logical block addresses and the data stream corresponding to the write command contains a specific mark and thereby the memory management circuit 202 transmits the C-APDU in the data stream to the smart card chip 108.

After the memory management circuit 202 transmits the C-APDU to the smart card chip 108, the state machine enters an in-progress state 403. When the state machine is in the in-progress state 403, the memory controller 104 waits for an R-APDU from the smart card chip 108. Namely, the in-progress state 403 indicates that the memory management circuit 202 has not yet received the R-APDU from the smart card chip 108. If the application program 1120 issues a read command corresponding to the file RF during this period, the memory management circuit 202 transmits a predetermined data stream (referred to as a second data stream thereinafter) back to the host system 1000.

To be specific, in the present exemplary embodiment, the memory storage apparatus 100 and the host system 1000 transmit data to each other in a transmission unit of a fixed size. For example, the transmission unit may be 512 bytes. Taking a data reading operation as an example, after issuing a read command to the memory storage apparatus 100, the OS 1110 of the host system 1000 issues a polling command to inquire the memory storage apparatus 100 whether the first 512 bytes of data in the data to be read is ready. When the first 512 bytes of data has been placed in the buffer memory 208, the memory management circuit 202 transmits the first 512 bytes of data to the host system 1000. After that, the OS 1110 of the host system 1000 issues another polling command to inquire the memory storage apparatus 100 whether the next 512 bytes of data in the data to be read is ready. This process goes on until the memory storage apparatus 100 receives a stop reading command, and then the memory management circuit 202 stops reading and transmitting data.

In the present exemplary embodiment, the size of the second data stream is 512 bytes and each bit in the second data stream is 0. In particular, when a data stream composed of multiple second data streams is received, the application program 1120 identifies that the R-APDU is not received successfully and tries to receive the R-APDU from the memory storage apparatus 100 by reading next set of data in the file RF. In the present exemplary embodiment, the application program 1120 transmits command data units of the smart card chip 108 in a fixed access unit. Thus, when an R-APDU is to be read, the application program 1120 sequentially reads data from the file RF in the fixed access unit. For example, the access unit may be 8 KB. Particularly, in the present exemplary embodiment, the start logical block address LBA(P) for storing the file RF is a multiple of the access unit so that the application program 1120 may access the data conveniently.

After the R-APDU of the smart card chip 108 is received, the state of the state machine changes from the in-progress state 403 to a data available state 405. When the state machine is in the data available state 405, the memory controller 104 waits for the host system 1000 to issue a read command corresponding to the specific logical block addresses. To be specific, the memory management circuit 202 stores the R-APDU received from the smart card chip 108 into the buffer memory 208, and when it receives the read command corresponding to the specific logical block addresses from the host system 1000, the memory management circuit 202 transmits the R-APDU to the host system 1000. In particular, after the R-APDU is transmitted to the host system 1000, the state of the state machine changes from the data available state 405 back to the idle state 401. Accordingly, the memory controller 104 can receive next C-APDU from the host system 1000 and transmit the next C-APDU to the smart card chip 108.

In the present exemplary embodiment, the memory storage apparatus 100 and the host system 1000 transmit data to each other via the cache memory 1106. To be specific, when the host system 1000 reads data from the memory storage apparatus 100, the OS 1110 of the host system 1000 improves the efficiency by prefetching previous and following addresses. For example, when the application program 1120 of the host system 1000 reads data of 8 KB by starting from the logical block address LBA(P) of the memory storage apparatus 100, the OS 1110 of the host system 1000 reads data of 64 KB by starting from the logical block address LBA(P−1) of the memory storage apparatus 100 and stores the data into the cache memory 1106.

Thereafter, the application program 1120 reads data of 8 KB from the cache memory 1106 by starting from the address for storing the data belonging to the logical block address LBA(P). Because the OS 1110 prefetches subsequent data, when the data corresponding to a next read command is already stored in the cache memory 1106, the OS 1110 of the host system 1000 may directly read the data from the cache memory 1106 so that the data access efficiency is improved.

It should be mentioned that in order to prevent the OS 1110 of the host system 1000 from affecting the transmission of R-APDUs of the smart card chip 108 by directly providing data from the cache memory 1106 to the application program 1120, in the present exemplary embodiment, the size of the file RF is designed to be greater than the size of the cache memory 1106. Accordingly, if the application program 1120 does not receive the R-APDU after it finishes reading all the data in the file RF and starts to read the file RF again, the OS 1110 must read the data from the memory storage apparatus 100 again so that the R-APDU can be transmitted to the host system 1000.

Figure 5:
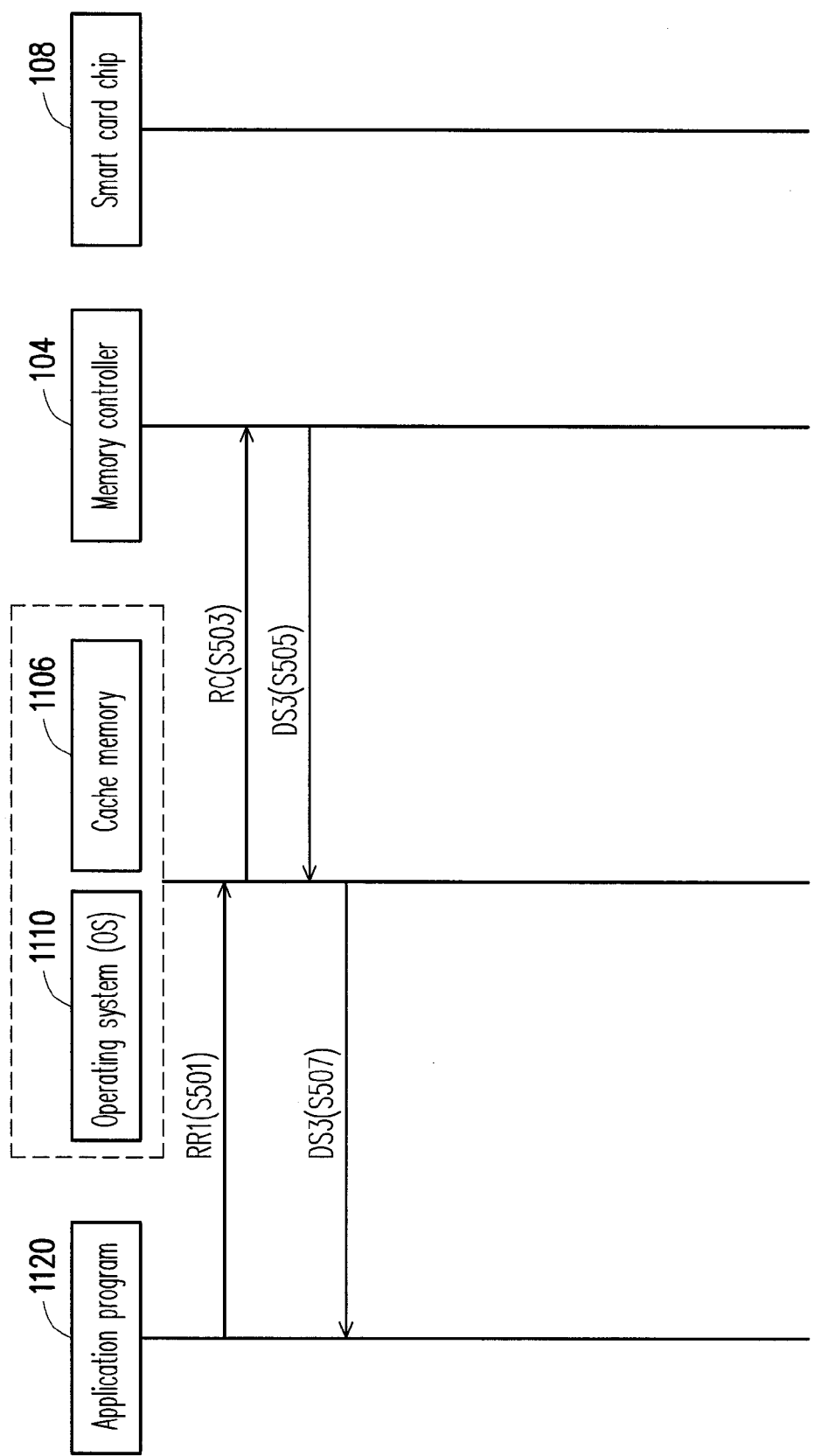
FIG. 5 is a diagram of prefetching a data stream according to the first exemplary embodiment of the present invention.

FIG. 5 is a diagram of prefetching a data stream according to the first exemplary embodiment of the present invention, in which it is assumed that the memory controller 104 has not received the R-APDU from the smart card chip 108 when the OS 1110 issues a read command.

Referring to FIG. 5, the application program 1120 sends a read request RR1 to the OS 1110 for reading data of 8 KB by starting from the specific logical block address LBA(P) (data flow S501).

If the data corresponding to the specific logical block address LBA(P) is not stored in the cache memory 1106, the OS 1110 sends a read command RC to the memory controller 104 to prefetch data of 64 KB by starting from the specific logical block address LAB(P−1) of memory storage apparatus 100 (data flow S503).

Because herein the memory controller 104 has not obtained the R-APDU from the smart card chip 108, the memory controller 104 transmits a plurality of second data streams DS3 to the host system 1000 (data flow S505). To be specific, after transmitting the read command RC, the OS 1110 constantly issues polling commands to read data, and the memory controller 104 transmits the second data streams DS3 to the host system 1000 in a transmission unit (for example, 512 bytes). Herein the size of the second data stream DS3 is 512 bytes. Thus, in order to respond to the read command RC for reading data of 64 KB by starting from the specific logical block address LBA(P−1), the memory controller 104 sequentially transmits 128 second data streams DS3 in response to the polling commands corresponding to the read command RC. Accordingly, a data stream containing the 128 second data streams DS3 is stored in the cache memory 1106.

Thereafter, the OS 1110 transmits the 8 KB data (i.e., 16 second data streams DS3) corresponding to the specific logical block address LBA(P) from the cache memory 1106 to the application program 1120 (data flow S507).

Figure 6:
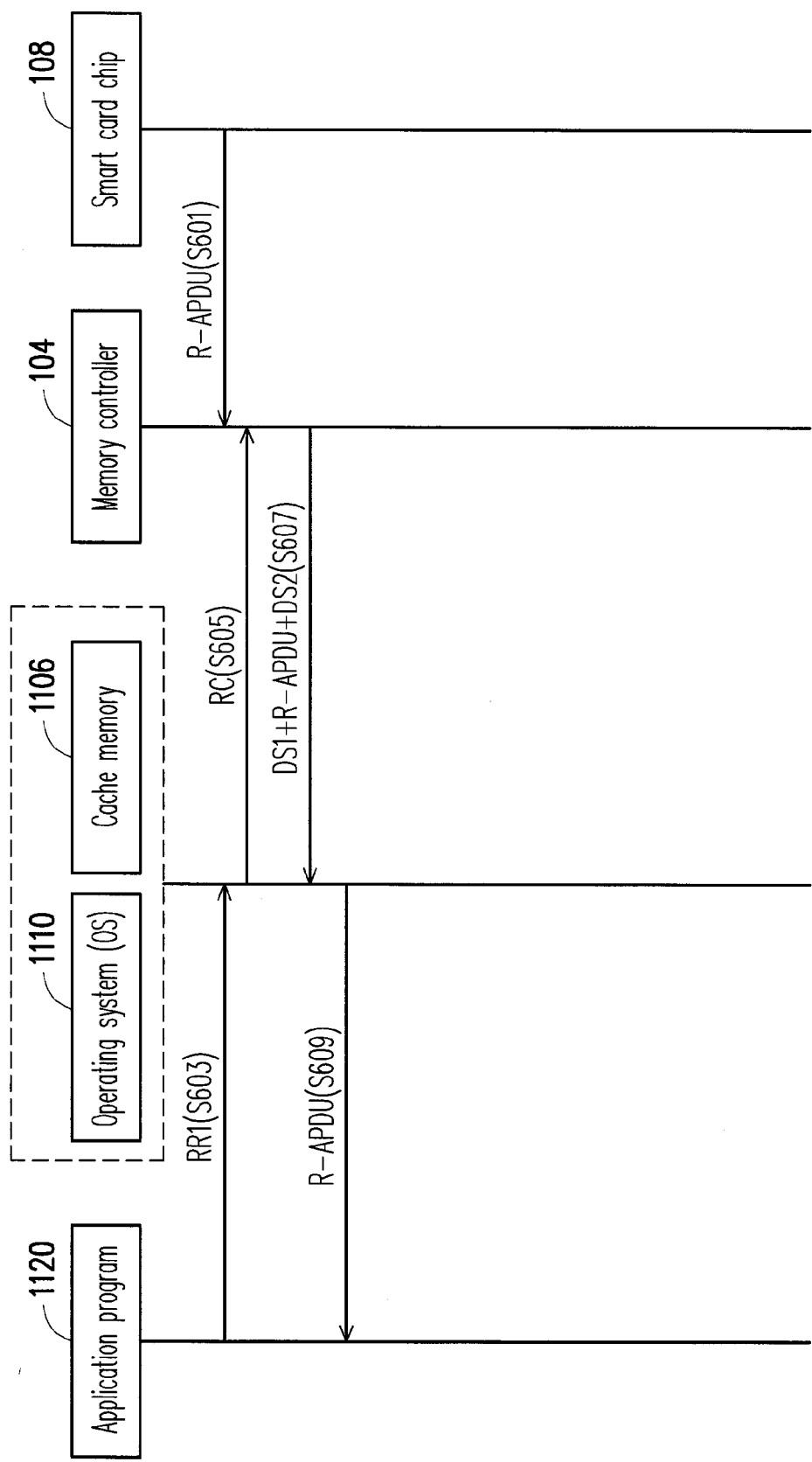
FIG. 6 is another diagram of prefetching a data stream according to the first exemplary embodiment of the present invention.

FIG. 6 is another diagram of prefetching a data stream according to the first exemplary embodiment of the present invention, in which it is assumed that the memory controller 104 has received the R-APDU from the smart card chip 108 when the OS 1110 issues a read command.

Referring to FIG. 6, in the data flow S601, the smart card chip 108 transmits the R-APDU to the memory controller 104.

In the data flow 5603, the application program 1120 sends a read request RR1 to the OS 1110 for reading data of 8 KB by starting from the specific logical block address LBA(P).

If the data corresponding to the specific logical block address LBA(P) is not stored in the cache memory 1106, the OS 1110 sends a read command RC to the memory controller 104 to prefetch data of 64 KB by starting from the specific logical block address LBA(P−1) (data flow S605).

Because herein the memory controller 104 has already obtained the R-APDU from the smart card chip 108, the memory controller 104 transmits the R-APDU to the host system 1000 (data flow S607). Similarly, after sending the read command RC, the OS 1110 constantly issues polling commands to read data, and the memory controller 104 transmits the R-APDU to the host system 1000 in a transmission unit (for example, 512 bytes).

It should be mentioned that in the present exemplary embodiment, the memory controller 104 transmits the R-APDU from the buffer memory 208 to the host system 1000 by aligning an access unit. To be specific, the memory controller 104 determines whether a start read address corresponding to the read command issued by the OS 1110 of the host system 1000 is a multiple of the access unit.

If the start read address is a multiple of the access unit, the memory controller 104 directly transmits the R-APDU to the host system 1000. If the start read address is not a multiple of the access unit, the memory controller 104 first transmits a first data stream to the host system 1000 and then transmits the R-APDU to the host system 1000. Herein the size of the first data stream is determined based on following formula (1):

$$S(D) = AAU - MOD(AAU, SRA) \quad (1)$$

wherein S(D) is the size of the first data stream, AAU is the access unit, SRA is the start read address of the read command, and MOD(AAU,SRA) is a remainder obtained by dividing the start read address of the read command by the access unit.

For example, if the access unit is 32 KB, the start read address of the read command is 5 KB, the read data quantity of the host system 1000 is 64 KB, and the memory controller 104 already receives 32 KB data of the R-APDU, the memory controller 104 first transmits the final 27 KB data of the R-APDU as the first data stream according to the formula (1) and then transmits the first 5 KB data of the R-APDU. Besides, the memory controller 104 also sequentially transmits the final 27 KB data and the first 5 KB data of the R-APDU. Herein the first data stream is considered the prefetched portion. Accordingly, the OS 1110 obtains the correct R-APDU when it reads data from the corresponding logical block addresses from the cache memory 1106 for the application program 1120.

Additionally, referring to FIG. 6, because one logical block address has a capacity of 4 KB, in order to respond a read command RC for reading data of 64 KB by starting from the specific logical block address LBA(P−1), the memory controller 104 transmits a first data stream DS1 of 4 KB before transmitting an R-APDU of 8 KB and transmits a data stream (referred to as a fourth data stream DS2 thereinafter) of 52 KB after transmitting the R-APDU. Accordingly, a data stream containing the first data stream, the R-APDU, and the fourth data stream is stored in the cache memory 1106.

Thereafter, the OS 1110 transmits data of 8 KB (i.e., the R-APDU) corresponding to the logical block address LBA(P) from the cache memory 1106 to the application program 1120 (data flow S609).

It should be mentioned that in the present exemplary embodiment, the each bit in the first data stream and the fourth data stream is 0. However, the present invention is not limited thereto, and in another exemplary embodiment of the present invention, the first data stream may also be a part of the R-APDU (for example, the last part of the R-APDU). Similarly, in yet another exemplary embodiment of the present invention, the fourth data stream may be a part of the R-APDU or the entire R-APDU. Namely, after transmitting the R-APDU, the memory controller 104 repeatedly transmits the R-APDU until the host system 1000 issues a stop reading command.

Figure 7:
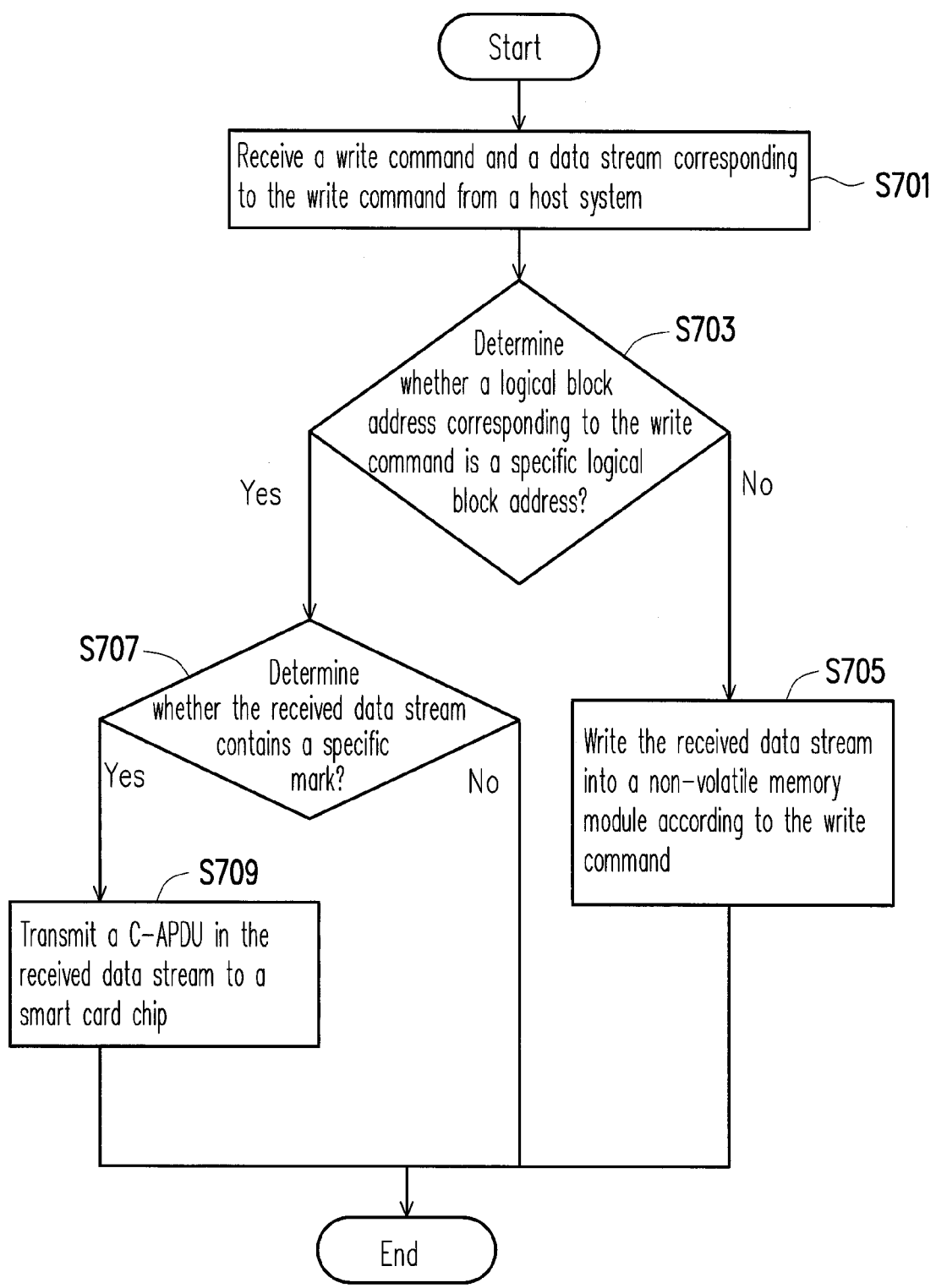
FIG. 7 is a portion of flowchart of a data stream dispatching method according to the first exemplary embodiment of the invention, in which the processing steps when a write command is received are illustrated.

FIG. 7 is a portion of flowchart of a data stream dispatching method according to the first exemplary embodiment of the invention, in which the processing steps when a write command is received are illustrated.

Referring to FIG. 7, in step S701, the memory management circuit 202 of the memory controller 104 receives a write command and a data stream corresponding to the write command from the host system 1000.

In step S703, the memory management circuit 202 determines whether a logical block address corresponding to the write command is a specific logical block address.

If the logical block address corresponding to the write command is not a specific logical block address, in step S705, the memory management circuit 202 writes the received data stream into the non-volatile memory module 106 according to the write command. If the logical block address corresponding to the write command is a specific logical block address, in step S707, the memory management circuit 202 determines whether a received data stream contains a specific mark.

If the received data stream contains the specific mark, in step S709, the memory management circuit 202 transmits a C-APDU in the received data stream (i.e., the portion of the received data stream excluding the specific mark) to the smart card chip 108. In particular, herein the state machine changes from the idle state 401 to the in-progress state 403. If it is determined in step S707 that the received data stream does not contain any specific mark, the procedure illustrated in FIG. 7 is terminated.

Figure 8:
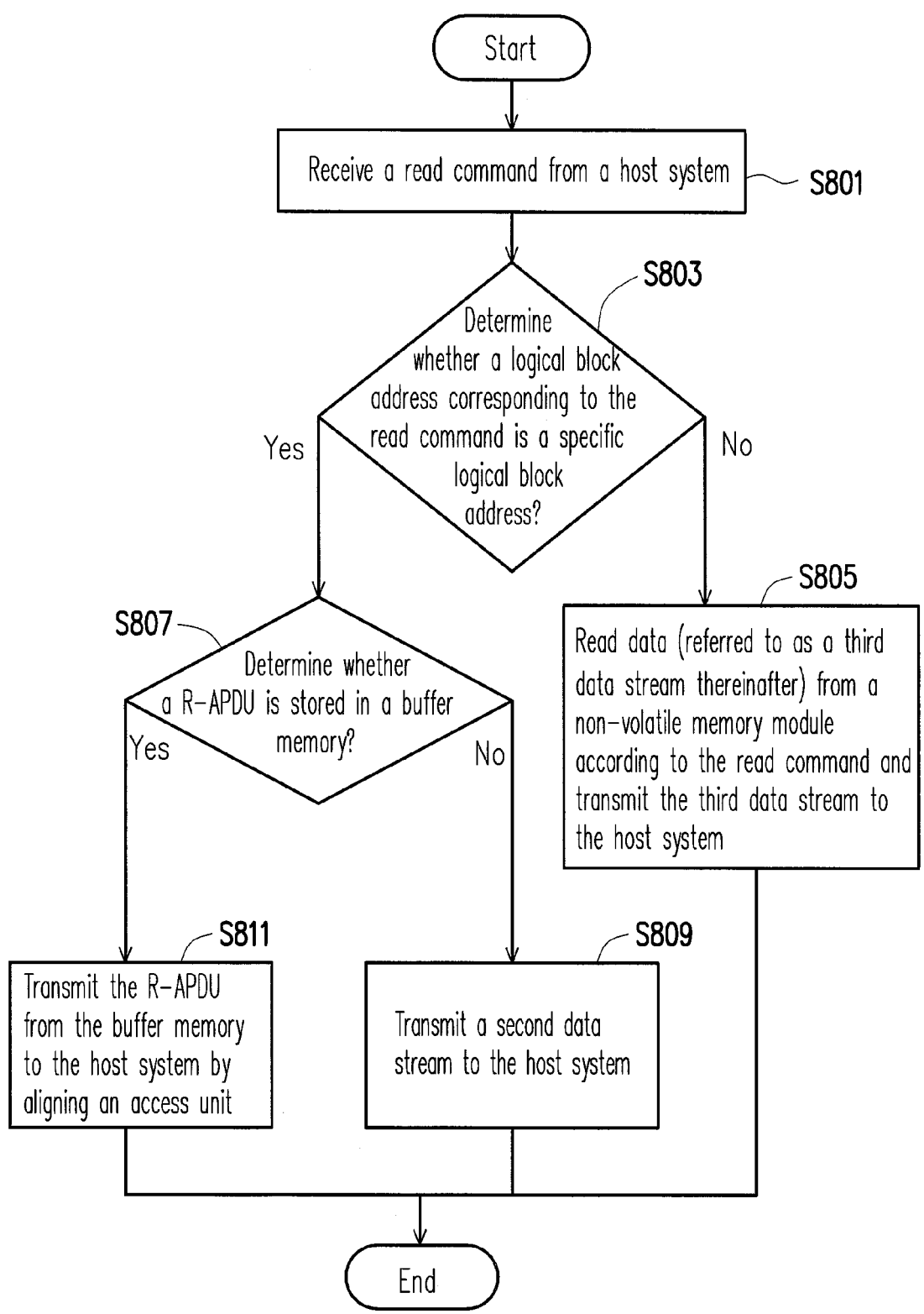
FIG. 8 is another portion flowchart of the data stream dispatching method according to the first exemplary embodiment of the invention, in which the processing steps when a read command is received are illustrated.

FIG. 8 is another portion of flowchart of a data stream dispatching method according to the first exemplary embodiment of the invention, in which the processing steps when a read command is received are illustrated.

Referring to FIG. 8, in step S801, the memory management circuit 202 of the memory controller 104 receives a read command from the host system 1000.

In step S803, the memory management circuit 202 determines whether the logical block address corresponding to the read command is a specific logical block address.

If the logical block address corresponding to the read command is not a specific logical block address, in step S805, the memory management circuit 202 reads data (referred to as a third data stream thereinafter) from the non-volatile memory module 106 according to the read command and transmits the third data stream to the host system 1000. If the logical block address corresponding to the read command is the specific logical block address, in step S807, the memory management circuit 202 determines whether a R-APDU is stored in the buffer memory 208 (i.e., whether the state machine is in the data available state 405).

If no R-APDU is stored in the buffer memory 208, in step S809, the memory management circuit 202 transmits the second data stream to the host system 1000. The technique for transmitting the second data stream and the R-APDU has been described above with reference to FIG. 5 therefore will not be described herein.

If an R-APDU is stored in the buffer memory 208, in step S811, the memory management circuit 202 transmits the R-APDU from the buffer memory 208 to the host system 1000 by aligning the access unit. For example, in step S811, the memory management circuit 202 determines whether a start read address corresponding to the read command is a multiple of the access unit. When the start read address corresponding to the read command is not a multiple of the access unit, the memory management circuit 202 first transmits a first data stream to the host system 1000 and then transmits the R-APDU to the host system 1000. Herein the size of the first data stream is obtained by dividing the start read address of the read command by the access unit to obtain a remainder and then deducting the remainder from the access unit. In addition, when the start read address corresponding to the read command is a multiple of the access unit, the memory management circuit 202 directly transmits the R-APDU to the host system 1000. Accordingly, when the OS 1110 of the host system 1000 issues a read command in aforementioned prefetching manner and the start read address is not aligned with the access unit of the application program 1120 for reading data, the memory management circuit 202 transmits the R-APDU by aligning the access unit so that the application program 1120 can correctly read the R-APDU.

Second Exemplary Embodiment

The memory storage apparatus and the host system in the second exemplary embodiment of the present invention are substantially the same as those in the first exemplary embodiment, and the difference between the two embodiments is that in the second exemplary embodiment, the memory controller determines whether a R-APDU is received when it transmits a data stream indicating that no R-APDU has been received to the host system, and the memory controller changes the data to be transmitted to the host system when the R-APDU is received, so as to improve the efficiency of R-APDU transmission. Below, the difference between the first and the second exemplary embodiment will be explained with reference to FIGS. 1-3.

In the first exemplary embodiment, when the application program 1120 is about to read the file RF in the access unit (i.e., 8 KB) to read the R-APDU received from the smart card chip 108, the OS 1110 of the host system 1000 issues a read command to the memory storage apparatus 100. Herein the memory controller 104 determines whether the R-APDU is already stored in the buffer memory 208 according to the state of the state machine. If the R-APDU is not stored in the buffer memory 208, the memory controller 104 transmits a second data stream in response to a polling command corresponding to the read command. Namely, when the read command is received, if the R-APDU is not stored in the buffer memory 208, the memory controller 104 constantly transmits the second data stream to the host system 1000 until it receives a stop reading command. However, as described above, besides the data prefetched by the application program 1120, the OS 1110 of the host system 1000 prefetches other data (for example, data of 64 KB) in the file RF and stores the prefetched data into the cache memory 1106. Thus, when the application program 1120 identifies that the data is not the R-APDU therefore continues to read next data in the file RF, the OS 1110 directly reads the next data from the cache memory 1106 for the application program 1120. Besides, the OS 1110 only issues a read command to the memory storage apparatus 100 to read data when the data to be read by the application program 1120 is not stored in the cache memory 1106. Namely, if the R-APDU is not yet stored in the buffer memory 208 at the time point when the OS 1110 issues the read command in the prefetching manner, the data prefetched by the OS 1110 does not contain the R-APDU, and the application program 1120 could only read the R-APDU from the cache memory 1106 after the OS 1110 issues a next read command to the memory storage apparatus 100. Thus, the time for the application program 1120 to receive the R-APDU may be delayed.

To avoid such a delay, in the second exemplary embodiment, the memory controller 104 further determines whether the R-APDU is already stored in the buffer memory 208 according to the state of the state machine during the process of responding to the polling commands. If the smart card chip 108 transmits the R-APDU during the process of responding to the polling commands, the memory controller 104 changes the data to be transmitted to the host system 1000 to allow the application program 1120 to receive the R-APDU earlier.

Figure 9:
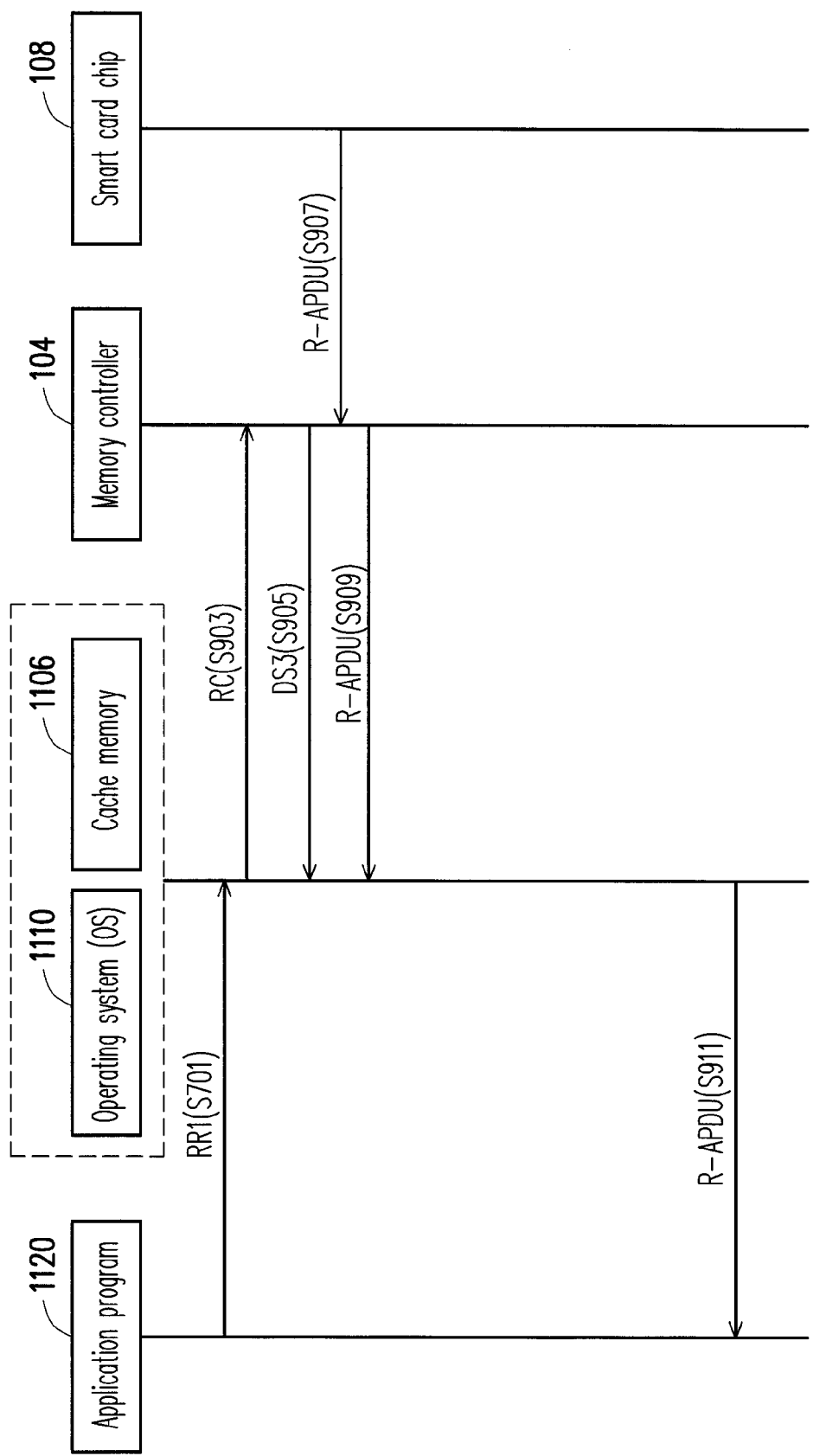
FIG. 9 is a diagram of prefetching a data stream according to a second exemplary embodiment of the present invention.

FIG. 9 is a diagram of prefetching a data stream according to the second exemplary embodiment of the present invention, in which it is assumed that the memory controller 104 receives an R-APDU from the smart card chip 108 during the OS 1110 prefetches data.

Referring to FIG. 9, in the data flow 5901, the application program 1120 sends a read request RR1 to the OS 1110 for reading data of 8 KB by starting from the specific logical block address LBA(P-1).

If the data corresponding to the specific logical block address LBA(P) is not stored in the cache memory 1106, the OS 1110 sends a read command RC to the memory controller 104 to prefetch data of 64 KB by starting from the specific logical block address (P-1) (data flow S903).

Because the memory controller 104 has not yet obtained the R-APDU from the smart card chip 108 at this time point, the memory controller 104 transmits a second data stream DS3 to the host system 1000 in response to the polling command corresponding to the read command. First, the memory controller 104 respectively transmits 8 second data streams to respond to first 8 polling commands (i.e., the simplified data flow S905). In particular, the 8 second data streams are corresponding to the logical block address LBA(P-1). Then, when another polling command is received, the memory controller 104 determines whether the read address (i.e., the logical block address LBA(P)) corresponding to the current polling command is a multiple of the access unit and determines once again whether the R-APDU is already stored in the buffer memory 208 according to the state of the state machine. Assuming that the smart card chip 108 transmits the R-APDU during the data flow S705 (i.e., data flow S907), the memory controller 104 transmits the R-APDU instead of the second data stream to the host system 1000 (i.e., data flow S909) in response to the current polling command. Thereafter, the application program 1120 may read the R-APDU correctly from the cache memory 1106 (i.e., data flow S911).

Namely, according to the present exemplary embodiment, in the case that the R-APDU has not been received from the smart card chip 108 when a read command is received and accordingly a second data stream is transmitted to the host system, if the read address corresponding to the current polling command is a multiple of the access unit and the R-APDU has been stored in the buffer memory 208 during the process of transmitting the second data stream, the memory controller 104 changes the data to be transmitted to the host system 1000 (i.e., replaces the second data stream with the R-APDU), so as to shorten the time for the application program 1120 to read the R-APDU correctly. It should be mentioned that the application program 1120 reads the R-APDU in the access unit. Thus, the R-APDU may only be correctly read by the application program 1120 if it is transmitted when the read address corresponding to the current polling command is a multiple of the access unit. Accordingly, in the present exemplary embodiment, the memory controller 104 only determines once again whether the R-APDU is stored in the buffer memory 208 according to the state of the state machine when the read address corresponding to the current polling command is a multiple of the access unit. However, it should be understood that the memory controller 104 may also determine whether the R-APDU is stored in the buffer memory 208 according to the state of the state machine at any time point and only replace the second data stream with the R-APDU when the R-APDU is stored in the buffer memory 208 and the read address corresponding to the current polling command is a multiple of the access unit.

Figure 10:
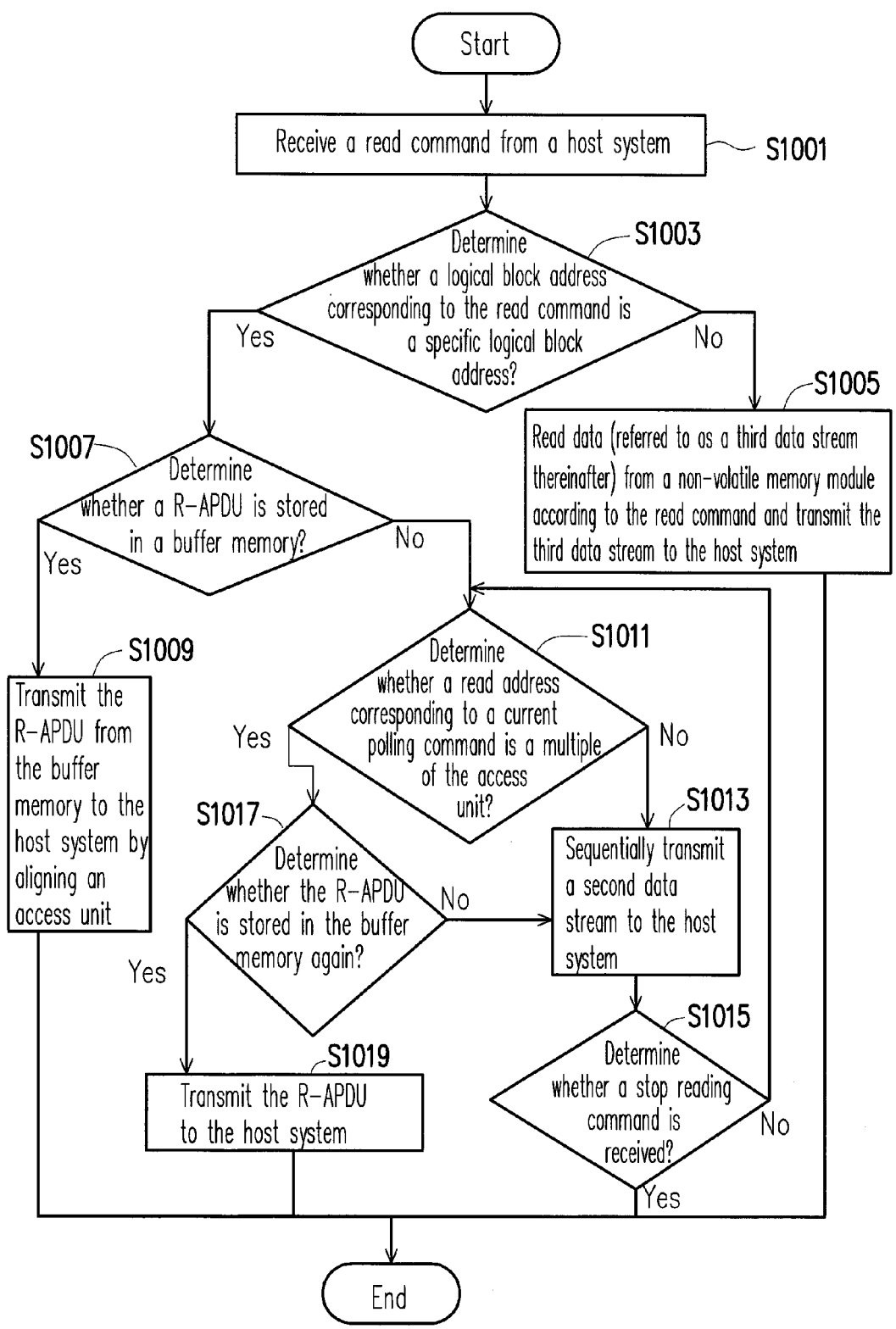
FIG. 10 is a flowchart of a data stream dispatching method according to the second exemplary embodiment of the present invention.

FIG. 10 is a flowchart of a data stream dispatching method according to the second exemplary embodiment of the invention, in which the processing steps when a read command is received are illustrated.

Referring to FIG. 10, in step S1001, the memory management circuit 202 of the memory controller 104 receives a read command from the host system 1000.

In step S1003, the memory management circuit 202 determines whether the logical block address corresponding to the read command is a specific logical block address.

If the logical block address corresponding to the read command is not a specific logical block address, in step S1005, the memory management circuit 202 reads data (referred to as a third data stream thereinafter) from the non-volatile memory module 106 according to the read command and transmits the third data stream to the host system 1000. After that, the procedure illustrated in FIG. 10 is terminated.

If the logical block address corresponding to the read command is a specific logical block address, in step S1007, the memory management circuit 202 determines whether a R-APDU is stored in the buffer memory 208 (i.e., determines whether the state machine is in the data available state 405).

If the R-APDU is stored in the buffer memory 208, in step S1009, the memory management circuit 202 transmits the R-APDU from the buffer memory 208 to the host system 1000 by aligning the access unit. After that, the procedure illustrated in FIG. 10 is terminated.

If the R-APDU is not stored in the buffer memory 208, in step S1011, the memory management circuit 202 determines whether the read address corresponding to the current polling command is a multiple of the access unit.

If the read address corresponding to the current polling command is not a multiple of the access unit, in step S1013, the memory management circuit 202 sequentially transmits a second data stream to the host system 1000. Besides, in step S1015, the memory management circuit 202 determines whether a stop reading command is received. If the stop reading command is received, the procedure illustrated in FIG. 10 is terminated. If no stop reading command is received, step S1011 is executed.

If the read address corresponding to the current polling command is a multiple of the access unit, in step S1017, the memory management circuit 202 determines whether the R-APDU is stored in the buffer memory 208 again. If no R-APDU is stored in the buffer memory 208, step S1013 is executed. If the R-APDU is stored in the buffer memory 208, in step S1019, the memory management circuit 202 transmits the R-APDU to the host system 1000. After that, the procedure illustrated in FIG. 10 is terminated.

As described above, in the data stream dispatching method and the memory controller and the memory storage apparatus using the same provided by exemplary embodiments of the present invention, an R-APDU of a smart card chip is transmitted according to an access unit. Thus, the R-APDU may be correctly transmitted to an application program of the smart card chip even if the operating system of the host system reads data in a prefetching manner. In addition, in the data stream dispatching method and the memory controller and the memory storage apparatus using the same provided by exemplary embodiments of the present invention, whether the smart card chip has transmitted back a R-APDU is determined again when a data stream indicating that no R-APDU has been received is transmitted, and when the smart card chip transmits the R-APDU back, the R-APDU is transmitted to the host system instead of the data stream. Thereby, the time for the application program of the smart card chip to correctly read the R-APDU can be shortened. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data stream dispatching method for a memory storage apparatus having a rewritable non-volatile memory module and a smart card chip, the data stream dispatching method comprising:
configuring a plurality of logical block addresses for the rewritable non-volatile memory module, wherein a plurality of specific logical block addresses among the logical block addresses is used for storing a specific file;
receiving a read command from a host system;
determining whether a start read address corresponding to the read command is one of the specific logical block addresses;
when the start read address corresponding to the read command is one of the specific logical block addresses, determining whether a response data unit from the smart card chip is stored in a buffer memory;
when the response data unit is stored in the buffer memory, transmitting the response data unit from the buffer memory to the host system by aligning an access unit,
wherein the step of transmitting the response data unit from the buffer memory to the host system by aligning the access unit comprises:
determining whether the start read address corresponding to the read command is a multiple of the access unit;
when the start read address corresponding to the read command is not a multiple of the access unit, first transmitting a first data stream to the host system and then transmitting the response data unit to the host system; and
when the start read address corresponding to the read command is a multiple of the access unit, transmitting the response data unit to the host system.

2. The data stream dispatching method according to claim 1,
wherein a size of the first data stream is determined according to following formula (1):

$$S(D)=AAU-MOD(AAU,SRA) \qquad (1)$$

wherein S(D) is the size of the first data stream, AAU is the access unit, SRA is the start read address corresponding to the read command, and MOD(AAU,SRA) is a remainder obtained by dividing the start read address corresponding to the read command by the access unit.

3. The data stream dispatching method according to claim 1, wherein the first data stream is a part of the response data unit.

4. The data stream dispatching method according to claim 3, wherein the step of transmitting the response data unit from the buffer memory to the host system by aligning the access unit further comprises:
after transmitting the response data unit to the host system, repeatedly transmitting the response data unit or a part of the response data unit to the host system until a stop reading command from the host system is received.

5. The data stream dispatching method according to claim 1 further comprising:
when the response data unit is not stored in the buffer memory, transmitting a second data stream to the host system, wherein each bit in the second data stream is 0.

6. The data stream dispatching method according to claim 1 further comprising:
when the start read address corresponding to the read command is not one of the specific logical block addresses, reading a third data stream corresponding to the read command from the rewritable non-volatile memory module according to the start read address corresponding to the read command and transmitting the third data stream corresponding to the read command to the host system.

7. The data stream dispatching method according to claim 1 further comprising:
when the response data unit is not stored in the buffer memory, determining whether a read address corresponding to a polling command issued by the host system is a multiple of the access unit, wherein when the read address corresponding to the polling command is not a multiple of the access unit, following step (a) is executed, and when the read address corresponding to the polling command is a multiple of the access unit, following step (b) is executed;
(a) transmitting a second data stream to the host system in response to the polling command, wherein each bit in the second data stream is 0;
(b) determining whether the response data unit is stored in the buffer memory, wherein when the response data unit is stored in the buffer memory, following step (c) is executed, and when the response data unit is not stored in the buffer memory, following step (d) is executed;
(c) transmitting the response data unit from the buffer memory to the host system; and
(d) transmitting the second data stream to the host system in response to the polling command.

8. A data stream dispatching method for a memory storage apparatus having a rewritable non-volatile memory module and a smart card chip, the data stream dispatching method comprising:
configuring a plurality of logical block addresses for the rewritable non-volatile memory module, wherein a plurality of specific logical block addresses among the logical block addresses is used for storing a specific file;
when a response data unit is received from the smart card chip, storing the response data unit into a buffer memory;
receiving a read command from a host system;
determining whether a start read address corresponding to the read command is one of the specific logical block addresses;
when the start read address corresponding to the read command is one of the specific logical block addresses, determining whether the response data unit is stored in the buffer memory;
when the response data unit is not stored in the buffer memory, determining whether a read address corresponding to a polling command issued by the host system is a multiple of an access unit, wherein when the read address corresponding to the polling command is not a multiple of the access unit, following step (a) is executed, and when the read address corresponding to the polling command is a multiple of the access unit, following step (b) is executed;

(a) transmitting a first data stream to the host system in response to the polling command, wherein each bit in the first data stream is 0;
(b) determining whether the response data unit is stored in the buffer memory, wherein when the response data unit is stored in the buffer memory, following step (c) is executed, and when the response data unit is not stored in the buffer memory, following step (d) is executed;
(c) transmitting the response data unit from the buffer memory to the host system; and
(d) transmitting the first data stream to the host system in response to the polling command.

9. The data stream dispatching method according to claim 8 further comprising:
when the start read address corresponding to the read command is not one of the specific logical block addresses, reading a second data stream corresponding to the read command from the rewritable non-volatile memory module according to the start read address corresponding to the read command and transmitting the second data stream corresponding to the read command to the host system.

10. A memory controller for a memory storage apparatus having a rewritable non-volatile memory module and a smart card chip, the memory controller comprising:
a host interface, configured to couple to a host system;
a memory interface, configured to couple to the rewritable non-volatile memory module;
a buffer memory; and
a memory management circuit, coupled to the buffer memory, the host interface and the memory interface,
wherein the memory management circuit configures a plurality of logical block addresses for the rewritable non-volatile memory module,
wherein a plurality of specific logical block addresses among the logical block addresses is used for storing a specific file,
wherein the memory management circuit receives a read command from the host system and determines whether a start read address corresponding to the read command is one of the specific logical block addresses,
wherein when the start read address corresponding to the read command is one of the specific logical block addresses, the memory management circuit determines whether a response data unit from the smart card chip is stored in the buffer memory,
wherein when the response data unit is stored in the buffer memory, the memory management circuit transmits the response data unit from the buffer memory to the host system by aligning an access unit,
wherein the memory management circuit determines whether the start read address corresponding to the read command is a multiple of the access unit,
wherein when the start read address corresponding to the read command is not a multiple of the access unit, the memory management circuit first transmits a first data stream to the host system and then transmits the response data unit to the host system,
wherein when the start read address corresponding to the read command is a multiple of the access unit, the memory management circuit transmits the response data unit to the host system.

11. The memory controller according to claim 10, wherein a size of the first data stream is determined according to following formula (1):

$$S(D) = AAU - MOD(AAU, SRA) \tag{1}$$

wherein S(D) is the size of the first data stream, AAU is the access unit, SRA is the start read address corresponding to the read command, and MOD(AAU,SRA) is a remainder obtained by dividing the start read address corresponding to the read command by the access unit.

12. The memory controller according to claim 10, wherein the first data stream is a last part of the response data unit.

13. The memory controller according to claim 12, wherein after transmitting the response data unit to the host system, the memory management circuit repeatedly transmits the response data unit or a part of the response data unit to the host system until a stop reading command is received from the host system.

14. The memory controller according to claim 10, wherein when the response data unit is not stored in the buffer memory, the memory management circuit transmits a second data stream to the host system, wherein each bit in the second data stream is 0.

15. The memory controller according to claim 10, wherein when the response data unit is received from the smart card chip, the memory management circuit stores the response data unit into the buffer memory.

16. A memory controller for a memory storage apparatus having a rewritable non-volatile memory module and a smart card chip, the memory controller comprising:
a host interface, configured to couple to a host system;
a memory interface, configured to couple to the rewritable non-volatile memory module;
a buffer memory; and
a memory management circuit, coupled to the buffer memory, the host interface and the memory interface,
wherein the memory management circuit configures a plurality of logical block addresses for the rewritable non-volatile memory module,
wherein a plurality of specific logical block addresses among the logical block addresses is used for storing a specific file,
wherein when a response data unit is received from the smart card chip, the memory management circuit stores the response data unit into the buffer memory,
wherein the memory management circuit receives a read command from the host system and determines whether a start read address corresponding to the read command is one of the specific logical block addresses,
wherein when the start read address corresponding to the read command is one of the specific logical block addresses, the memory management circuit determines whether the response data unit is stored in the buffer memory,
wherein when the response data unit is not stored in the buffer memory, the memory management circuit determines whether a read address corresponding to a polling command issued by the host system is a multiple of an access unit,
wherein when the read address corresponding to the polling command is not a multiple of the access unit, the memory management circuit transmits a first data stream to the host system in response to the polling command, wherein each bit in the first data stream is 0,
wherein when the read address corresponding to the polling command is a multiple of the access unit, the memory management circuit determines whether the response data unit is stored in the buffer memory,
wherein when the response data unit is stored in the buffer memory, the memory management circuit transmits the response data unit from the buffer memory to the host system,
wherein when the response data unit is not stored in the buffer memory, the memory management circuit transmits the first data stream to the host system in response to the polling command.

17. The memory controller according to claim 16,
wherein when the start read address corresponding to the read command is not one of the specific logical block addresses, the memory management circuit reads a second data stream corresponding to the read command from the rewritable non-volatile memory module according to the start read address corresponding to the read command and transmits the second data stream corresponding to the read command to the host system.

18. A memory storage apparatus, comprising:
a connector, configured to couple to a host system;
a rewritable non-volatile memory module;
a smart card chip; and
a memory controller, coupled to the connector, the rewritable non-volatile memory module and the smart card chip, and having a buffer memory,
wherein the memory controller configures a plurality of logical block addresses for the rewritable non-volatile memory module,
wherein a plurality of specific logical block addresses among the logical block addresses is used for storing a specific file,
wherein when a response data unit is received from the smart card chip, the memory controller stores the response data unit into the buffer memory,
wherein the memory controller receives a read command from the host system and determines whether a start read address corresponding to the read command is one of the specific logical block addresses,
wherein when the start read address corresponding to the read command is one of the specific logical block addresses, the memory controller determines whether the response data unit is stored in the buffer memory,
wherein when the response data unit is stored in the buffer memory, the memory controller transmits the response data unit from the buffer memory to the host system by aligning an access unit,
wherein the memory controller determines whether the start read address corresponding to the read command is a multiple of the access unit,
wherein when the start read address corresponding to the read command is not a multiple of the access unit, the memory controller first transmits a first data stream and then transmits the response data unit to the host system,
wherein when the start read address corresponding to the read command is a multiple of the access unit, the memory controller transmits the response data unit to the host system.

19. The memory storage apparatus according to claim 18, wherein a size of the first data stream is determined according to following formula (1):

$$S(D) = AAU - MOD(AAU, SRA) \quad (1)$$

wherein S(D) is the size of the first data stream, AAU is the access unit, SRA is the start read address corresponding to the read command, and MOD(AAU,SRA) is a remainder obtained by dividing the start read address corresponding to the read command by the access unit.

20. The memory storage apparatus according to claim 18, wherein the first data stream is a last part of the response data unit.

21. The memory storage apparatus according to claim 20, wherein after transmitting the response data unit to the host system, the memory controller repeatedly transmits the response data unit or a part of the response data unit to the host system until a stop reading command is received from the host system.

22. The memory storage apparatus according to claim 18, wherein when the response data unit is not stored in the buffer memory, the memory controller transmits a second data stream to the host system, wherein each bit in the second data stream is 0.

23. The memory storage apparatus according to claim 18, wherein when the start read address corresponding to the read command is not one of the specific logical block addresses, the memory controller reads a third data stream corresponding to the read command from the rewritable non-volatile memory module according to the start read address corresponding to the read command and transmits the third data stream corresponding to the read command to the host system.

24. The memory storage apparatus according to claim 18, wherein when the response data unit is not stored in the buffer memory, the memory controller determines whether a read address corresponding to a polling command issued by the host system is a multiple of the access unit,
  wherein when the read address corresponding to the polling command is not a multiple of the access unit, the memory controller transmits a second data stream to the host system in response to the polling command, wherein each bit in the second data stream is 0,
  wherein when the read address corresponding to the polling command is a multiple of the access unit, the memory controller determines whether the response data unit is stored in the buffer memory,
  wherein when the response data unit is stored in the buffer memory, the memory controller transmits the response data unit from the buffer memory to the host system,
  wherein when the response data unit is not stored in the buffer memory, the memory controller transmits the second data stream to the host system in response to the polling command.

25. A memory storage apparatus, comprising:
  a connector, configured to couple to a host system;
  a rewritable non-volatile memory module;
  a smart card chip; and
  a memory controller, coupled to the connector, the rewritable non-volatile memory module and the smart card chip, and having a buffer memory,
  wherein the memory controller configures a plurality of logical block addresses for the rewritable non-volatile memory module,
  wherein a plurality of specific logical block addresses among the logical block addresses is used for storing a specific file,
  wherein when a response data unit is received from the smart card chip, the memory controller stores the response data unit into the buffer memory,
  wherein the memory controller receives a read command from the host system and determines whether a start read address corresponding to the read command is one of the specific logical block addresses,
  wherein when the start read address corresponding to the read command is one of the specific logical block addresses, the memory controller determines whether the response data unit is stored in the buffer memory,
  wherein when the response data unit is not stored in the buffer memory, the memory controller determines whether a read address corresponding to a polling command issued by the host system is a multiple of an access unit,
  wherein when the read address corresponding to the polling command is not a multiple of the access unit, the memory controller transmits a first data stream to the host system in response to the polling command, wherein each bit in the first data stream is 0,
  wherein when the read address corresponding to the polling command is a multiple of the access unit, the memory controller determines whether the response data unit is stored in the buffer memory,
  wherein when the response data unit is stored in the buffer memory, the memory controller transmits the response data unit from the buffer memory to the host system,
  wherein when the response data unit is not stored in the buffer memory, the memory controller transmits the first data stream to the host system in response to the polling command.

26. The memory storage apparatus according to claim 25, wherein when the start read address corresponding to the read command is not one of the specific logical block addresses, the memory controller reads a second data stream corresponding to the read command from the rewritable non-volatile memory module according to the start read address corresponding to the read command and transmits the second data stream corresponding to the read command to the host system.

* * * * *